United States Patent
Xia et al.

(10) Patent No.: US 12,266,074 B2
(45) Date of Patent: Apr. 1, 2025

(54) METHOD FOR GENERATING HIGH DEFINITION MAP, DEVICE AND COMPUTER STORAGE MEDIUM

(71) Applicant: BEIJING BAIDU NETCOM SCIENCE TECHNOLOGY CO., LTD., Beijing (CN)

(72) Inventors: Deguo Xia, Beijing (CN); Jizhou Huang, Beijing (CN); Haifeng Wang, Beijing (CN)

(73) Assignee: NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/758,692

(22) PCT Filed: Nov. 17, 2021

(86) PCT No.: PCT/CN2021/131180
§ 371 (c)(1),
(2) Date: Jul. 12, 2022

(87) PCT Pub. No.: WO2022/257358
PCT Pub. Date: Dec. 15, 2022

(65) Prior Publication Data
US 2024/0185379 A1    Jun. 6, 2024

(30) Foreign Application Priority Data
Jun. 8, 2021    (CN) .......................... 202110637791.9

(51) Int. Cl.
*G06T 3/14*    (2024.01)
*G06T 5/80*    (2024.01)
(Continued)

(52) U.S. Cl.
CPC .................. *G06T 3/14* (2024.01); *G06T 5/80* (2024.01); *G06T 7/38* (2017.01); *G06T 7/70* (2017.01)

(58) Field of Classification Search
CPC .... G01C 21/3804; G06N 3/0464; G06N 3/08; G06T 3/14; G06T 5/80; G06T 7/30;
(Continued)

(56) References Cited

U.S. PATENT DOCUMENTS

2018/0190016 A1* 7/2018 Yang ....................... G06V 20/58
2018/0192059 A1* 7/2018 Yang ................... G01C 21/3848
(Continued)

FOREIGN PATENT DOCUMENTS

CN    101976429 A    2/2011
CN    105678689 A    6/2016
(Continued)

OTHER PUBLICATIONS

Cheng et al. "Intensity thresholding and deep learning based lane marking extraction and lane width estimation from mobile light detection and ranging (LiDAR) point clouds." Remote Sensing 12.9 (2020): 1379. (Year: 2020).*

(Continued)

*Primary Examiner* — Katrina R Fujita
(74) *Attorney, Agent, or Firm* — Kwan & Olynick LLP

(57) ABSTRACT

A method and an apparatus for generation a high definition map, a device and a computer storage medium, which relate to automatic driving and deep learning technologies in the field of artificial intelligence technologies, are disclosed. An implementation includes: acquiring point cloud data and front-view image data which are collected respectively by a plurality of collecting devices at a plurality of location points to obtain a sequence of point clouds and a sequence of front-view images; performing registration of the front-
(Continued)

view images and the point clouds on the sequence of point clouds and the sequence of front-view images; transforming the sequence of front-view images into a top-view image based on the result of the registration and determining coordinate information of each pixel in the top-view image; and identifying map elements of the top-view image to obtain the high definition map.

19 Claims, 5 Drawing Sheets

(51) Int. Cl.
*G06T 7/38* (2017.01)
*G06T 7/70* (2017.01)

(58) Field of Classification Search
CPC .... G06T 7/33; G06T 7/38; G06T 7/70; G06T 17/05; G06T 17/20; G06T 2207/10016; G06T 2207/10024; G06T 2207/10028; G06T 2207/20084; G06T 2207/30252
See application file for complete search history.

(56) References Cited

U.S. PATENT DOCUMENTS

| | | | |
|---|---|---|---|
| 2018/0216942 A1* | 8/2018 | Wang | G01S 17/89 |
| 2019/0050648 A1 | 2/2019 | Stojanovic et al. | |
| 2019/0120948 A1* | 4/2019 | Yang | G01S 7/4817 |
| 2019/0122386 A1* | 4/2019 | Wheeler | G01C 21/1652 |
| 2019/0219700 A1* | 7/2019 | Coombe | G01S 17/86 |
| 2019/0222736 A1* | 7/2019 | Wheeler | G06T 7/80 |
| 2019/0271559 A1* | 9/2019 | Colgate | G01C 21/3667 |
| 2020/0393261 A1* | 12/2020 | Zhang | G08G 1/0141 |
| 2021/0035314 A1 | 2/2021 | Shu et al. | |
| 2021/0063200 A1* | 3/2021 | Kroepfl | C03C 17/3644 |
| 2021/0148722 A1 | 5/2021 | Ko | |
| 2021/0180980 A1* | 6/2021 | Luthardt | G01C 21/3837 |
| 2021/0334988 A1 | 10/2021 | Xiao et al. | |

FOREIGN PATENT DOCUMENTS

| | | | |
|---|---|---|---|
| CN | 106910217 A | 6/2017 | |
| CN | 108230247 A | 6/2018 | |
| CN | 108801171 A | 11/2018 | |
| CN | 109059942 A | 12/2018 | |
| CN | 109543520 A | 3/2019 | |
| CN | 110160502 A | 8/2019 | |
| CN | 110568451 A | 12/2019 | |
| CN | 105678689 B | 1/2020 | |
| CN | 111160360 A | 5/2020 | |
| CN | 111311709 A | 6/2020 | |
| CN | 111508021 A | 8/2020 | |
| CN | 111652179 A | 9/2020 | |
| CN | 111784836 A | 10/2020 | |
| CN | 112105890 A | 12/2020 | |
| CN | 112434119 A | 3/2021 | |
| CN | 112434706 A | 3/2021 | |
| CN | 112673232 A | 4/2021 | |
| CN | 113409459 A | 9/2021 | |
| WO | 2020154966 A1 | 8/2020 | |

OTHER PUBLICATIONS

Guan et al. "Automated road information extraction from mobile laser scanning data." IEEE Transactions on Intelligent Transportation Systems 16.1 (2014): 194-205. (Year: 2014).*
Ma et al. "Generation of horizontally curved driving lines in HD maps using mobile laser scanning point clouds." IEEE Journal of Selected Topics in Applied Earth Observations and Remote Sensing 12.5 (2019): 1572-1586. (Year: 2019).*
Lee et al. "Vpgnet: Vanishing point guided network for lane and road marking detection and recognition." Proceedings of the IEEE international conference on computer vision. 2017. (Year: 2017).*
Qin et al. "RoadMap: A Light-Weight Semantic Map for Visual Localization towards Autonomous Driving." arXiv preprint arXiv: 2106.02527 (2021). (Year: 2021).*
Ye et al. "Robust lane extraction from MLS point clouds towards HD maps especially in curve road." IEEE Transactions on Intelligent Transportation Systems 23.2 (2020): 1505-1518. (Year: 2020).*
Zheng et al. "Lane-level road network generation techniques for lane-level maps of autonomous vehicles: A survey." Sustainability 11.16 (2019): 4511. (Year: 2019).*
Daniel Lawrence Lu, Vision-Enhanced Lidar Odometry and Mapping, Aug. 1, 2016, 54 pgs.
EESR for EP21916644.4, issued on Feb. 20, 2024, 11 pgs.
Chinese First Office Action Dated Nov. 19, 2021 For Chinese Application No. 202110637791.9, 12 Pages.
Chinese International Search Report Dated Aug. 6, 2021 For PCT Application No. PCT/CN2021/131180, 4 Pages.
Chinese Notice of Allowance Dated May 19, 2022 For Chinese Application No. 202110637791.9, 3 Pages.
Chinese Second Office Action Dated Mar. 15, 2022 For Chinese Application No. 202110637791.9, 9 Pages.
First Office Action for KR10-2022-7023591, issued on Aug. 9, 2024, 8 pgs.

* cited by examiner

METHOD FOR GENERATING HIGH DEFINITION MAP, DEVICE AND COMPUTER STORAGE MEDIUM

The present application is a national application and, pursuant to 35 U.S.C. § 371, is entitled to and claims the right of priority based on PCT Application No. PCT/CN2021/131180, filed on Nov. 17, 2021, which claims priority to Chinese Patent Application No. 202110637791.9, filed on Jun. 8, 2021, entitled "Method and Apparatus for Generating High Definition Map, Device and Computer Storage Medium", which are hereby incorporated by reference in their entireties.

TECHNICAL FIELD

The present disclosure relates to the field of computer application technologies, and particularly to automatic driving and deep learning technologies in the field of artificial intelligence technologies.

BACKGROUND

As an important part of an automatic driving system, a high definition map is one of key factors for promoting development of automatic driving. A traditional map has low precision, and may only provide road-level route planning. By providing high definition positioning and lane-level path planning capabilities, and abundant road element information, the high definition map may help users to know location information in advance, accurately plan driving routes, and predict complex road surface information, so as to better avoid potential risks. Therefore, generation of a high definition map becomes an urgent problem to be solved.

SUMMARY

In view of this, the present disclosure provides a method for generating a high definition map, a device and a computer storage medium.

According to a first aspect of the present disclosure, there is provided a method for generating a high definition map method, including:
acquiring point cloud data and front-view image data which are collected respectively by a plurality of collecting devices at a plurality of location points to obtain a sequence of point clouds and a sequence of front-view images:
performing registration of the front-view images and the point clouds on the sequence of point clouds and the sequence of front-view images:
transforming the sequence of front-view images into a top-view image based on the result of the registration and determining coordinate information of each pixel in the top-view image; and
identifying map elements of the top-view image to obtain the high definition map.

According to a second aspect of the present disclosure, there is provided an electronic device, including:
at least one processor; and
a memory connected with the at least one processor communicatively:
where the memory stores instructions executable by the at least one processor to enable the at least one processor to perform the method as mentioned above.

According to a third aspect of the present disclosure, there is provided a non-transitory computer readable storage medium with computer instructions stored thereon, where the computer instructions are used for causing a computer to perform the method as mentioned above.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the present solution and do not constitute a limitation of the present disclosure. In the drawings.

DETAILED DESCRIPTION

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and structures are omitted in the descriptions below.

Existing methods for generating high definition maps are mainly based on a point cloud technology. A large amount of dense point cloud data is collected by a laser radar device, and is processed and identified to obtain information, such as roads, ground marks, or the like, and then, the data is corrected manually, and finally, a high definition map is generated. However, such traditional method is highly dependent on the point cloud data. Due to a complex urban road space structure, in order to guarantee precision of the high definition map, a large amount of manpower is required for registration, thereby resulting in a low production efficiency of the high definition map, a high labor cost, and a high requirement for professional skills of operators, and finally affecting large-scale production of the high definition map.

In view of this, the present disclosure provides a method for generating a high definition map which is different from the above-mentioned traditional method. The method according to the present disclosure will be described below in detail in conjunction with an embodiment.

Figure 1:
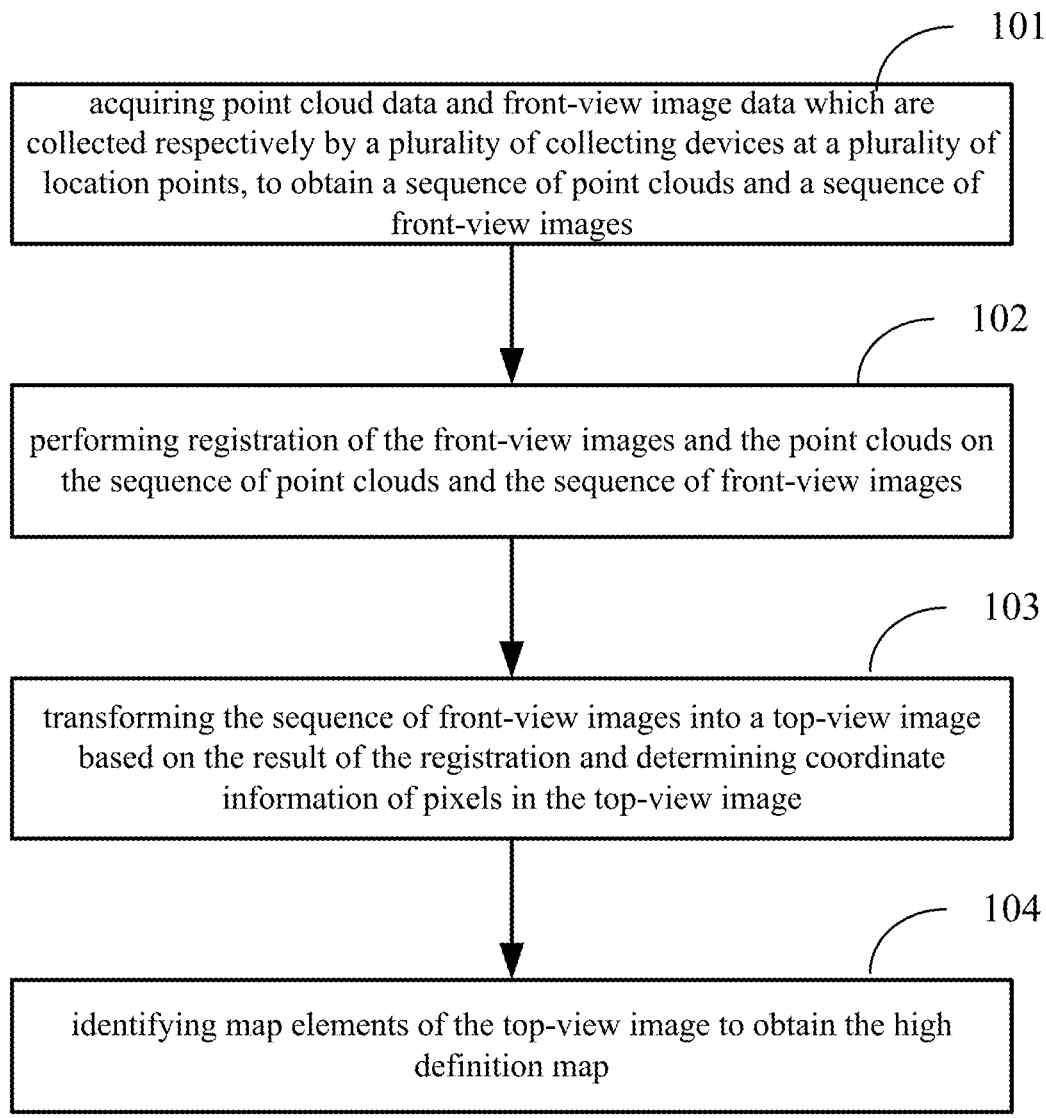
FIG. 1 is a flow chart of a method for generating a high definition map according to an embodiment of the present disclosure.

FIG. 1 is flow chart of a method for generating a high definition map according to an embodiment of the present disclosure. A recommending apparatus may serve as an executing subject of the method, and may be located in an application of a local terminal, or configured as a functional unit, such as a plug-in or software development kit (SDK) located in the application of the local terminal, or the like, or located at a server side, which is not particularly limited in the embodiment of the present disclosure. As shown in FIG. 1, the method may include:

101: acquiring point cloud data and front-view image data which are collected respectively by a plurality of collecting devices at a plurality of location points to obtain a sequence of point clouds and a sequence of front-view images.

102: performing registration of the front-view images and the point clouds on the sequence of point clouds and the sequence of front-view images.

103: transforming the sequence of front-view images into a top-view image based on the result of the registration and determining coordinate information of each pixel in the top-view image.

104: identifying map elements of the top-view image to obtain the high definition map.

From the above technical solution, the present disclosure has an idea of fusing image data collected by an image collecting device and point cloud data collected by a laser radar device, thereby realizing automatic registration of mutual fusion, and generating a final high definition map based on the registration result. In this way, a large amount of extra manpower is not required for manual registration, thereby improving a generation efficiency, reducing a labor cost and a requirement for professional skills of operators, and providing a basis for large-scale production of the high definition map.

The steps in the above-mentioned embodiment are described in detail below.

First, the step 101 of acquiring point cloud data and front-view image data which are collected by a plurality of collecting devices at a plurality of location points to obtain a sequence of point clouds and a sequence of front-view images is described in detail with reference to an embodiment.

The collecting devices involved in this step mainly includes the following two types:

an image collecting device, such as a camera, a video camera, or the like, capable of collecting images periodically or after triggered; and a laser radar device capable of acquiring data (i.e., point cloud data) of a set of reflection points on a surface of a surrounding environment by emitting laser for scanning periodically or after triggered. The point cloud data includes coordinate information of points, and the coordinate information is usually coordinates under a coordinate system of the laser radar device.

The collecting devices may also include a device which has a positioning function, that is, is responsible for collecting location information, for example, a global navigation satellite system (GNSS) device.

In the present disclosure, a movable device (for example, a collecting vehicle) may be used to carry the collecting devices, and then, the collecting devices collect data at a certain frequency or are triggered at a same location point to collect data during travel of the movable device.

For example, the image collecting device collects the front-view images at a certain collection frequency to form the sequence of front-view images $\mathcal{I}=\{I_1, I_2, \ldots, I_N\}$, $I_i$ being one front-view image collected at time $t_i$.

The laser radar device collects the point cloud data at a certain collection frequency to form the sequence of point clouds $\mathcal{P}=\{P_1, P_2, \ldots, P_N\}$, $P_i$ being one point cloud collected at time $t_i$. Each point cloud includes coordinate information of M points: that is, the coordinate information included in one point cloud is $P_i=\{p_1, p_2, \ldots, p_M\}$, $p_j$ being the coordinate information of the j th point.

A location collecting device collects location data at a certain collection frequency to form a location sequence $\mathcal{L}=\{L_1, L_2, \ldots, L_N\}$, $L_i$ being the location data collected at time $t_i$.

The N is the number of times of data collection of the collecting device (i.e., the quantity of the data obtained by each collecting device).

As an exemplary implementation, in order to guarantee synchronization of the data and a subsequent registration process, clock synchronization and/or joint calibration may be performed on the collecting devices in advance.

For example, the clock synchronization performed between the collecting devices is required to reach a millimeter level. A specific synchronization method may be selected from the "pulse per second (PPS)+national marine electronics association (NMEA)" based on GPS, or the IEEE 1588 (or IEEE 802.1AS) clock synchronization protocol based on Ethernet.

The joint calibration of the collecting devices is mainly aimed at obtaining internal and external parameter information of the image collecting device in the collecting devices, external parameter information of the laser radar device, a transformation and translation matrix $M_1$ from a laser radar coordinate system to an image-collecting-device coordinate system, and an internal parameter information matrix $M_2$ of the image collecting device.

A joint calibration method mainly includes the steps of presetting a calibration plate, and adjusting the laser radar device and the image collecting device to take pictures of and capture a point cloud of the calibration plate. Then, at least three corresponding two-dimensional points on the picture and three-dimensional points of the point cloud are found to form three point pairs. Perspective-n-point (PNP) solving is performed using the three point pairs to obtain a transformation relationship between the coordinate system of the laser radar device and the coordinate system of the image collecting device.

The clock synchronization and the joint calibration between the devices may be performed using existing mature technologies, and therefore are not detailed here.

The step 102 of performing registration of the front-view images and the point clouds on the sequence of point clouds and the sequence of front-view images is described in detail with reference to an embodiment.

Figure 2:
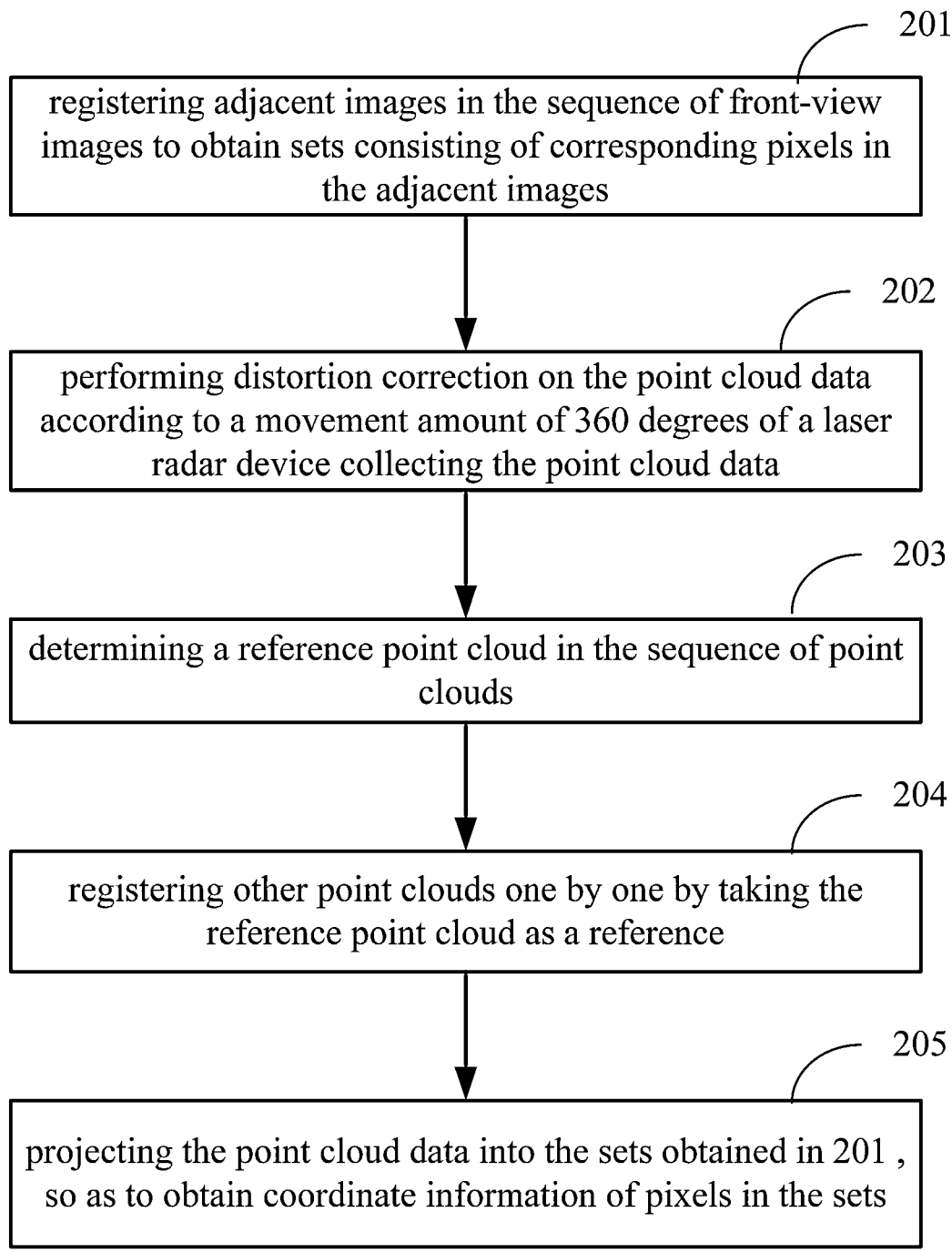
FIG. 2 is a flow chart of an exemplary registration according to an embodiment of the present disclosure.

The step of performing registration of the front-view images and the point clouds on the sequence of point clouds and the sequence of front-view images has an idea of registering adjacent images in the sequence of front-view images to obtain sets consisting of corresponding pixels in the adjacent images, and then projecting the point cloud data to the sets, thereby obtaining coordinate information of each pixel in the sets. In the registration process, actually, on the one hand, the accurate pixels are determined, and on the other hand, the coordinate information of the pixels is determined. An exemplary implementation is described below, FIG. 2 is a flow chart of an exemplary registration according to an embodiment of the present disclosure, and as shown in FIG. 2, the process may include the following steps:

201: registering adjacent images in the sequence of front-view images to obtain sets consisting of corresponding pixels in the adjacent images.

Since the images are collected at a certain frequency in the image collecting device, adjacent two image are different. The step has a purpose of obtaining corresponding pixels in the adjacent images, and it is assumed that after two continuous image frames $\mathcal{X}^l$ and $\mathcal{Y}^l$ are subjected to image registration, obtained K pixels in the image $\mathcal{P}$ correspond to K pixels in the image $\mathcal{Y}^l$, and these pixels are expressed as sets $\mathcal{P}=\{p_1^{\mathcal{X}^l}, p_2^{\mathcal{X}^l}, \ldots, p_K^{\mathcal{X}^l}\}$ and $\mathcal{Y}^l=\{p_1^{y^l}, p_2^{y^l}, \ldots, p_K^{y^l}\}$ respectively. The pixel $p_1^{\mathcal{X}^l}$ of the image $\mathcal{P}$ corresponds to the pixel $p_1^{y^l}$ of the image $\mathcal{Y}^l$, $p_2^{\mathcal{X}^l}$ corresponds to $p_2^{y^l}$, and so on so forth.

The registration may be performed using a feature-based method, a deep learning method, or the like. The feature-based method mainly includes the following steps: determining features of each pixel in the two images, where the features may be determined using scale-invariant feature transform (SIFT), or the like; and then performing feature matching based on a similarity method, so as to obtain the corresponding pixels. For example, two pixels with similarity between the features exceeding a preset similarity threshold are matched successfully.

The deep learning method mainly includes the following steps: generating feature vector representations of the pixels using layers of a convolutional neural network, a visual geometry group network (VGG), or the like, and then performing feature matching based on the feature vector representations of the pixels in the two images, thereby obtaining the corresponding pixels. For example, two pixels with similarity between the feature vector representations exceeding a preset similarity threshold are matched successfully.

202: performing distortion correction on the point cloud data according to a movement amount of 360 degrees of the laser radar device collecting the point cloud data.

The step is exemplary performed to assist in improving accuracy of the point cloud data in the subsequent registration process.

A global shutter is adopted in the image collecting device, and the images may be considered to be acquired instantaneously. However, acquisition of the data by the laser radar device is not instantaneous, and the data is usually collected after a transceiver rotates by one turn (i.e., 360 degrees). Assuming that one rotation takes 100 ms, in one frame of point cloud data (or one point cloud) formed in one collection cycle, an initial point and a final point have a difference of 100 ms, and in addition, collection of the laser radar device is realized in a movement process, such that there exists distortion in the point cloud data, and a real environment at a certain moment may not be truly reflected. In order to better register the image data and the point cloud data, the distortion correction is performed on the point cloud data in the step.

Laser radar calculates coordinates of laser points based on a coordinate system of the laser radar at the moment when a laser beam is received, such that reference coordinate systems of plural rows of laser points are different in the movement process of the laser radar. However, these laser points are in a same frame point cloud data (same point cloud), and therefore are required to be unified in a same coordinate system during the distortion correction.

The distortion correction has an idea of calculating movement of the laser radar during the collection process, and then compensating the movement amount on each point cloud, the compensation including rotation compensation and translation compensation. Firstly, a first laser point in a point cloud is determined, a rotation angle and a translation amount of a subsequent laser point relative to the first laser point may be determined, and then, compensation transformation of rotation and translation is carried out successively, so as to obtain corrected coordinate information of the subsequent laser point.

Still further, after step 202, a set consisting of corresponding points in the adjacent images may also be determined.

Specifically, a projection matrix from the point cloud to the image may be obtained according to an internal parameter information matrix of the image collecting device, a rotation matrix from the image-collecting-device coordinate system to an image plane, and the transformation and translation matrix from the laser radar coordinate system to the image-collecting-device coordinate system; and then, the point cloud data is projected onto the image using the projection matrix. After projection, the corresponding point cloud sets in the adjacent images may be determined.

Assuming that two continuous images $\mathcal{X}^l$ and $\mathcal{Y}^l$ are subjected to the above projection to obtain a set consisting of $K_1$ points projected into the image $\mathcal{X}^l$ and a set consisting of $K_2$ points projected into the image $\mathcal{Y}^l$, an intersection of the two sets is solved, i.e., a set $P^{\mathcal{X},y}$ consisting of the corresponding points in the image $\mathcal{X}^l$ and the image $\mathcal{Y}^l$. The usage of the set will be referred to in the following embodiments.

203: determining a reference point cloud in the sequence of point clouds.

Specifically, a first point cloud in the sequence of point clouds may be used as the reference point cloud.

In a practical situation, the first point cloud in the sequence of point clouds may not be most accurate. Therefore, the present disclosure provides an exemplary method for determining the reference point cloud. Specifically, the first point cloud in the sequence of point clouds may be used as a reference, and other point clouds may be registered one by one: and a point cloud in the sequence of point clouds having highest proportion of registration points with previous and next point clouds is used as the reference point cloud.

Figure 3:
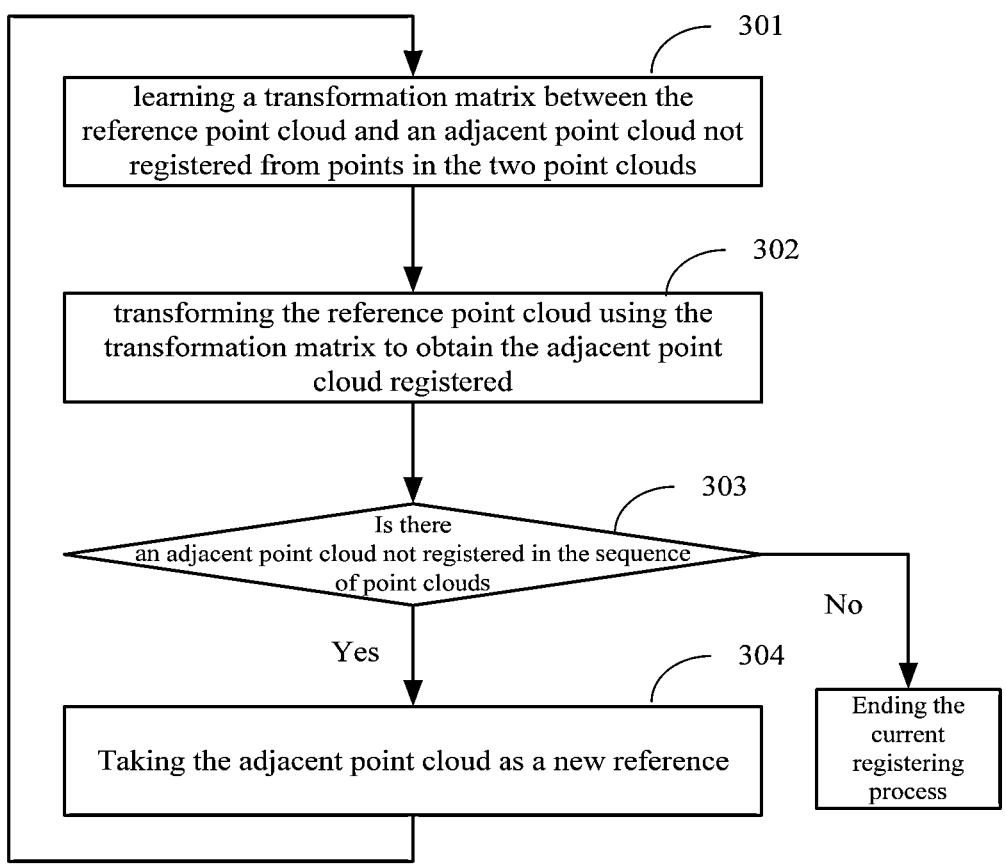
FIG. 3 is a flow chart of a method for registering point clouds one by one according to an embodiment of the present disclosure.

When each of the other point clouds is registered one by one (or frame by frame), the method shown in FIG. 3 may be used, and includes the following steps:

301: learning a transformation matrix between the reference point cloud and an adjacent point cloud not registered from the points in the two point clouds.

If the first point cloud is used as the reference, the first point cloud and the second point cloud are determined, and the transformation matrix of the first point cloud and the second point cloud is learned from the points in the two point clouds.

Two adjacent point clouds are actually in a relationship of rotation and translation: that is, the second point clouds will be obtained in theory by rotation and translation of the first point cloud. In an actual scenario, since the collecting device may have a jolt, or the like, in a traveling process and some deviations may exist, the transformation matrix may be learned using an iterative closest point (ICP) method, or the like. For example, a rotation matrix is represented as R, a translation matrix is represented as t, and then, during the learning of R and t, a loss function may be: a distance mean or weighted mean between each transformed point obtained by transforming each point in the reference point cloud according to the transformation matrix and a point in the adjacent point cloud closest to the transformed point.

For example, the following loss function may be adopted:

$$E(R, t) = \frac{1}{n}\sum_{i=1}^{n}\|R(x_i) + t - y_{m(x_i)}\|^2 \quad (1)$$

where E(R, t) represents the loss function, $x_i$ represents a point in the reference point cloud, for example, the first point cloud, $R(x_i)$+t represents transforming of $x_i$ according to the transformation matrix, and $y_{m(x_i)}$ is the closest point matched in the adjacent point cloud, for example, the second point cloud after the transforming of $x_i$. n is the number of the points capable of being matched. After learning point by point, with a goal of minimizing the above loss function, the transformation matrices R and t may be learned finally.

As another example, the following loss function may also be adopted:

$$E(R, t) = \frac{1}{n}\sum_{i=1}^{n}w_i\|R(x_i) + t - y_{m(x_i)}\|^2 \quad (2)$$

Different from the above formula (1), a weighting coefficient $w_i$ is added, and a value thereof may be determined according to whether a point in the reference point cloud belongs to the set $P^{x,y}$ consisting of corresponding point clouds. For example, the following formula may be adopted:

$$w_i = \begin{cases} \alpha, & \text{if } x_i \in P^{x,y} \\ 1, & \text{else} \end{cases} \quad (3)$$

where $\alpha \geq 1$, for example, $\alpha=1.5$ or $\alpha=2.0$.

In addition to the above ICP method, a depth-feature-based learning method, such as deep global registration (DGR), or the like, may be adopted.

302: transforming the reference point cloud using the transformation matrix to obtain a registered adjacent point cloud.

For example, each point in the first point cloud is transformed using the above transformation matrices R and t to obtain each registered point in the second point cloud.

303: judging whether adjacent point clouds which are not registered exist in the sequence of point clouds, and if yes, executing step 304; and if no, ending the current registration process.

304: taking the adjacent point cloud as a new reference, and proceeding to step 301.

For example, the registered second point cloud is used as a new reference, and a third point cloud is subjected to the above process for registration, so as to obtain each registered point. Then, the registered third point cloud is used as a new reference, a fourth point cloud is subjected to the above process for registration, and the rest can be done in the same manner.

After the registration of all point clouds in the sequence of point clouds is completed, the point cloud in the sequence of point clouds having highest proportion of matching points with a previous and next point clouds is used as the reference point cloud. The proportion $A_j$ of the registration points of the j th point cloud $P_j$ may be determined using the following formula:

$$A_j = \frac{|\text{match}(P_{j-1}, P_j)| + |\text{match}(P_{j+1}, P_j)|}{|P_{j-1}| + |P_{j+1}|} \quad (4)$$

where match( ) represents an intersection of points capable of being registered in two adjacent point clouds, and may be embodied as an intersection of all points obtained by transforming one point cloud set according to the transformation matrix and all points in the other point cloud. | | represents a number of points in the set: for example, $|P_{j-1}|$ represents a number of points in the (j−1)th point cloud.

Reference is continuously made to FIG. 2. 204: registering the other point clouds one by one with the reference point cloud as a reference.

After the reference point cloud is determined, the method shown in FIG. 3 is adopted, and the other point cloud is registered one by one with the reference point cloud as the reference. If the reference point cloud is the first point cloud, all the subsequent point clouds are registered sequentially. If the reference point cloud is not the first point cloud, all the point clouds are registered forwardly and backwardly with the reference point cloud as the reference. Finally, a sequence of point clouds registered is obtained.

205: projecting the registered point cloud data into the sets obtained in step 201, so as to obtain the coordinate information of pixels in the sets.

Specifically, the step may include: projecting coordinates of the point cloud data to the sets to obtain the coordinate information of points corresponding to pixels in the front-view images: and transforming the coordinate information of the points corresponding to the pixels in the front-view images into the coordinate information of the pixels according to the transformation and translation matrix from a laser radar coordinate system to an image-collecting-device coordinate system.

The above sets are actually sets of the corresponding pixels obtained after the registration of the adjacent images. The point cloud data is projected respectively onto the images, and points (i.e., laser points) falling into the sets are taken to obtain the coordinate information of the points corresponding to pixels in the sets in the front-view images. For a method of projecting the point cloud data to the image, reference may be made to the relevant description in the previous embodiments, which will not be repeated herein.

After the coordinate information of the points corresponding to the pixels in the front-view images is obtained, since the coordinate system of the laser radar device is different from the coordinate system of the image collecting device, the coordinate information of the point cloud is required to be transformed into the coordinate information of the pixels, that is, transformed to the coordinate system of the image collecting device.

The step 103 of transforming the sequence of front-view images into a top-view image based on the result of the registration and determining coordinate information of pixels in the top-view image is described in detail with reference to an embodiment.

In the step, front-view images in the sequence of front-view images may be transformed respectively into top-view images based on inverse perspective transformation; and then, matching is performed on corresponding top-view images according to the coordinate information of pixels in the front-view images, so as to determine the coordinate information of pixels in the top-view images.

The inverse perspective transformation is a common method of performing image projection transformation at present. The inverse perspective transformation has essence of transforming a front-view image collected by an image collecting device into a plane z=0 under a world coordinate system.

It is assumed that the coordinate information of a pixel in a front-view image is represented as (u, v), and (u, v) is required to be transformed into coordinates (x, y, z) in the world coordinate system. The following parameters may be acquired in the joint calibration process:

γ: an included angle between the projection of an optical axis o of the image collecting device on the plane z=0 and a y axis;

θ: an angle of the optical axis o of the image collecting device deviated from the plane z=0;

2α: a view angle of the image collecting device;

$R_x$: a resolution of the image collecting device in a horizontal direction; and $R_y$: a resolution of the image collecting device in a perpendicular direction.

An inverse perspective transformation model may be represented as follows:

$$x = h \times \cot\left(\frac{2\alpha}{R_y - 1}u - \alpha + \theta\right) \times \sin\left(\frac{2\alpha}{R_x - 1}v - \alpha + \gamma\right) + d \quad (5)$$

$$y = h \times \cot\left(\frac{2\alpha}{R_y - 1}u - \alpha + \theta\right) \times \cos\left(\frac{2\alpha}{R_x - 1}v - \alpha + \gamma\right) + d \quad (6)$$

where h is a height of the image collecting device from the ground, and cot( ) is a cotangent function.

Figure 4A:
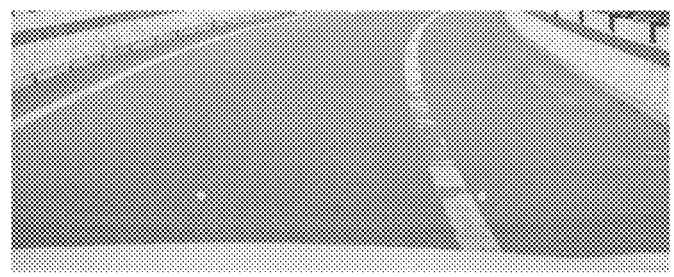
FIGS. 4a and 4b are instance diagrams of a front-view image and a top-view image respectively.
Figure 4B:
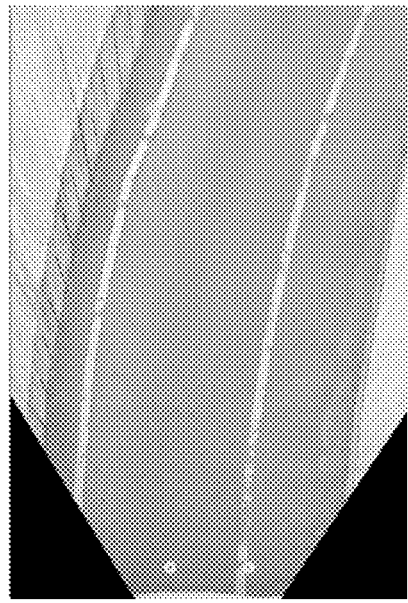

With the above inverse perspective transformation, a front-view image shown in FIG. 4a may be transformed into a top-view image shown in FIG. 4b.

According to the inverse perspective transformation theory, actually, each front-view image in the sequence of front-view images may be transformed into one top-view image, and if there exist N front-view images, N top-view images are obtained. Actually, the top-view images are overlapped with each other, and particularly, most regions of two adjacent top-view images are overlapped. In the above process, the coordinate information of the pixels in the top-view images may be obtained, such that the top-view images may be spliced one by one based on location information of the pixels in each top-view image, so as to finally obtain the high definition map.

The step 104 of identifying map elements of the top-view image to obtain high definition map data is described in detail with reference to an embodiment.

In the step, road information of the top-view image obtained in step 103 may be identified; and then, the identified road information is overlaid onto the top-view image for display to obtain the high definition map.

The road information may include lane lines, lane line types (for example, a white solid line, a single yellow solid line, double yellow solid lines, a yellow dotted solid line, a diversion line, a yellow no-stopping line, or the like), colors, guide arrow information of lanes, lane types (for example, a main lane, a bus lane, a tidal flow lane, or the like), or the like.

During the above identification, the road information may be segmented using a semantic segmentation model based on a deep neural network, for example, DeepLabV3. The road information may also be identified using an image identification technology based on a deep neural network, for example, regions with CNN features (Faster-RCNN).

It should be noted here that the identification based on the above-mentioned top-view image is mainly identification of ground elements, i.e., the identification of the road information. Other map elements, such as traffic signs, buildings, or the like, are identified from the front-view image. A method in the prior art may be adopted for this part, which is not limited in the present disclosure.

After the identified road information is overlaid onto the top-view image for display, an operator may directly compare the data of the top-view image with the overlaid road information, and correct the data having problems, so as to produce the final high definition map.

The method according to the present disclosure is described above in detail, and an apparatus according to the present disclosure will be described below in detail in conjunction with an embodiment.

Figure 5:
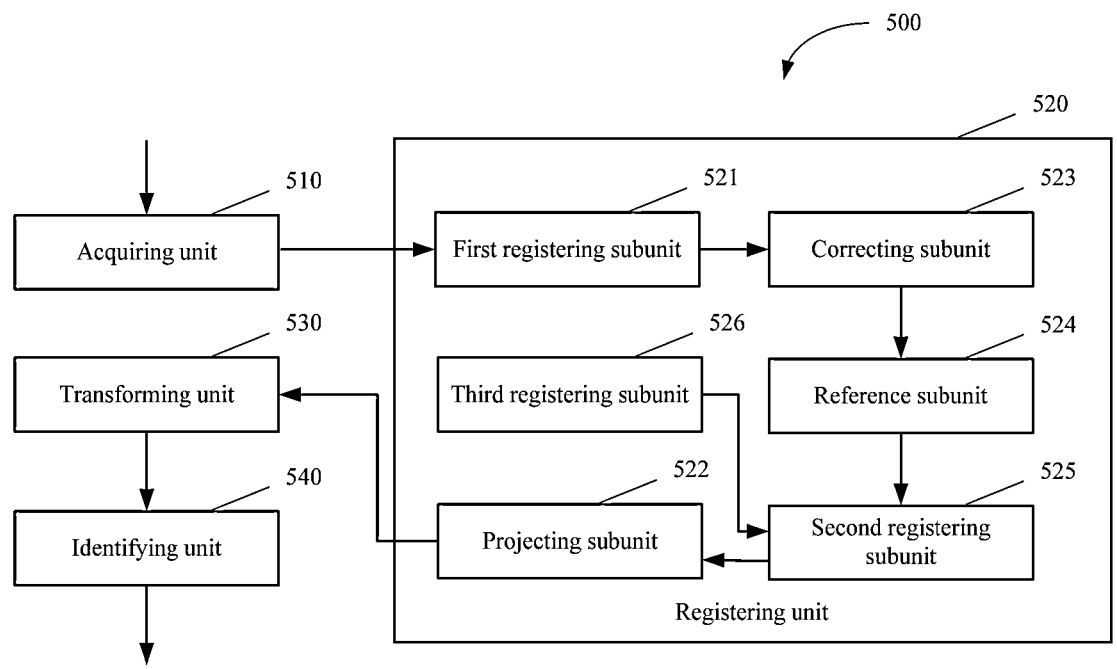
FIG. 5 is a structural diagram of an apparatus for generating a high definition map according to an embodiment of the present disclosure.

FIG. 5 is a structural diagram of an apparatus for generating a high definition map according to an embodiment of the present disclosure, and as shown in FIG. 5, the apparatus 500 may include an acquiring unit 510, a registering unit 520, a transforming unit 530 and an identifying unit 540. The main functions of each constitutional unit are as follows.

The acquiring unit 510 is configured to acquire point cloud data and front-view image data which are collected by a plurality of collecting devices at a plurality of location points to obtain a sequence of point clouds and a sequence of front-view images.

The above-mentioned collecting device at least includes an image collecting device for collecting front-view images and a laser radar device for collecting the point cloud data.

As an exemplary implementation, in order to guarantee synchronization of data and a subsequent registration process, clock synchronization and/or joint calibration may be performed on the collecting devices in advance.

The registering unit 520 is configured to perform registration of the front-view images and the point clouds on the sequence of point clouds and the sequence of front-view images.

The transforming unit 530 is configured to transform the sequence of front-view images into a top-view image based on the result of the registration and determine coordinate information of pixels in the top-view image.

The identifying unit 540 is configured to identify map elements of the top-view image to obtain the high definition map.

Specifically, the registering unit 520 may include a first registering subunit 521 and a projecting subunit 522, and may further include a correcting subunit 523, a reference subunit 524, a second registering subunit 525 and a third registering subunit 526.

The first registering subunit 521 is configured to register adjacent images in the sequence of front-view images to obtain sets consisting of corresponding pixels in the adjacent images.

The projecting subunit 522 is configured to project the point cloud data into the sets, so as to obtain coordinate information of pixels in the sets.

As an exemplary implementation, the correcting subunit 523 is configured to perform distortion correction on the point cloud data according to a movement amount of 360 degrees of a laser radar device collecting the point cloud data, and then provide the point cloud data to the projecting subunit 522.

As another exemplary implementation, the reference subunit 524 is configured to determine a reference point cloud in the sequence of point clouds.

The second registering subunit 525 is configured to register other point cloud data one by one by taking the reference point cloud as a reference, and provide the point clouds registered to the projecting subunit 522.

The above-mentioned two methods may be combined; for example, the correcting subunit 523 is used firstly to perform the distortion correction on the point cloud data, the reference subunit 524 then determines the reference point cloud, and the second registering subunit 525 performs the registration.

The reference subunit 524 may use a first point cloud in the sequence of point clouds as the reference point cloud. However, as an exemplary implementation, the reference subunit 524 is specifically configured to provide the first point cloud in the sequence of point clouds to the second registering subunit 525 as the reference for registering the other point clouds one by one, and obtain the result of registration from the second registering subunit 525: and take one point cloud in the sequence of point clouds having highest proportion of matching points with a previous point cloud and a next point clouds as the reference point cloud.

The second registering subunit 525 is configured to:
learn a transformation matrix between the reference point cloud and an adjacent point cloud not registered from points in the two point clouds:
transform the reference point cloud using the transformation matrix to obtain the adjacent point cloud registered; and
take the adjacent point cloud as a new reference, and proceed to perform the operation of learning the transformation matrix between the reference point cloud and the adjacent point cloud not registered from points in the two point clouds, until all point cloud data in the sequence of point clouds is registered.

As an implementation, when learning the transformation matrix between the reference point cloud and the adjacent point cloud not registered from the points in the two point clouds, the second registering subunit 525 is specifically configured to: learn the transformation matrix between the reference point cloud and the adjacent point cloud from the points in the two point clouds using an ICP algorithm; the ICP algorithm uses a loss function of: a distance mean or weighted mean between each transformed point obtained by transforming each point in the reference point cloud according to the transformation matrix and each point in the adjacent point cloud closest to the each transformed point.

As an exemplary implementation, the third registering subunit 526 is configured to determine a set consisting of corresponding points in the adjacent images.

When the second registering subunit 525 determines the weighted mean, a weight for each distance is determined according to whether a point in the reference point cloud belongs to the set consisting of the corresponding points.

The projecting subunit 522 is specifically configured to: project coordinates of the point cloud data to the sets to obtain the coordinate information of the points corresponding to pixels in the front-view image; and transform the coordinate information of the points corresponding to the pixels in the front-view image into the coordinate information of the pixels according to a transformation and translation matrix from a laser radar coordinate system to an image-collecting-device coordinate system.

The transforming unit 530 is specifically configured to transform respectively the front-view images in the sequence of front-view images into top-view images based on inverse perspective transformation: and perform matching on corresponding top-view images according to the coordinate information of pixels in the front-view images, so as to determine the coordinate information of pixels in the top-view images.

The identifying unit 540 is specifically configured to identify road information of the top-view image: and overlay the road information identified onto the top-view image for display, to obtain the high definition map data.

The road information may include lane lines, lane line types (for example, a white solid line, a single yellow solid line, double yellow solid lines, a yellow dotted solid line, a diversion line, a yellow no-stopping line, or the like), colors, guide arrow information of lanes, lane types (for example, a main lane, a bus lane, a tidal flow lane, or the like), or the like.

During the above identification, the road information may be segmented using a semantic segmentation model based on a deep neural network, for example, DeepLabV3. The road information may also be identified using an image identification technology based on a deep neural network, for example, regions with CNN features (Faster-RCNN).

The embodiments in the specification are described progressively, and mutual reference may be made to same and similar parts among the embodiments, and each embodiment focuses on differences from other embodiments. In particular, since the apparatus embodiment is substantially similar to the method embodiment, the description is relatively simple, and reference may be made to the corresponding description of the method embodiment for relevant points.

According to the embodiment of the present disclosure, there are also provided an electronic device, a readable storage medium and a computer program product.

Figure 6:
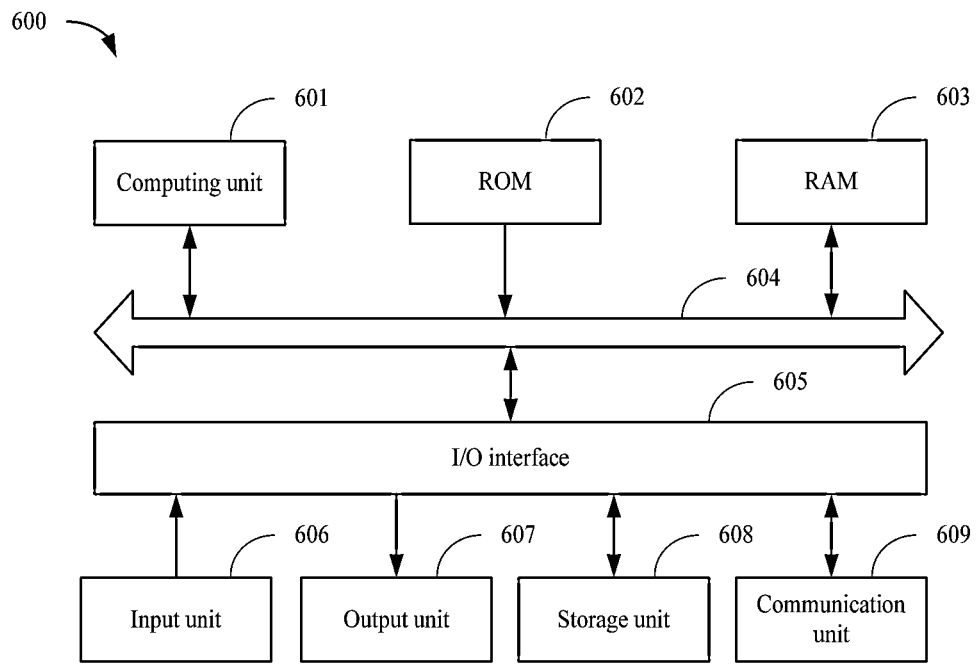
FIG. 6 is a block diagram of an electronic device configured to implement embodiments of the present disclosure.

FIG. 6 is a block diagram of an electronic device configured to implement a high definition map producing method according to the embodiment of the present disclosure. The electronic device is intended to represent various forms of digital computers, such as laptop computers, desktop computers, workstations, personal digital assistants, servers, blade servers, mainframe computers, and other appropriate computers. The electronic device may also represent various forms of mobile devices, such as personal digital assistants, cellular telephones, smart phones, wearable devices, and other similar computing devices. The components shown herein, their connections and relationships, and their functions, are meant to be exemplary only, and are not meant to limit implementation of the present disclosure described and/or claimed herein.

As shown in FIG. 6, the device 600 includes a computing unit 601 which may perform various appropriate actions and processing operations according to a computer program stored in a read only memory (ROM) 602 or a computer program loaded from a storage unit 608 into a random access memory (RAM) 603. Various programs and data necessary for the operation of the device 600 may be also stored in the RAM 603. The computing unit 601, the ROM 602, and the RAM 603 are connected with one other through a bus 604. An input/output (I/O) interface 605 is also connected to the bus 604.

The plural components in the device 600 are connected to the I/O interface 605, and include: an input unit 606, such as a keyboard, a mouse, or the like: an output unit 607, such as various types of displays, speakers, or the like: the storage unit 608, such as a magnetic disk, an optical disk, or the like: and a communication unit 609, such as a network card, a modem, a wireless communication transceiver, or the like.

The communication unit 609 allows the device 600 to exchange information/data with other devices through a computer network, such as the Internet, and/or various telecommunication networks.

The computing unit 601 may be a variety of general and/or special purpose processing components with processing and computing capabilities. Some examples of the computing unit 601 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 601 performs the methods and processing operations described above, such as the high definition map producing method. For example, in some embodiments, the high definition map producing method may be implemented as a computer software program tangibly contained in a machine readable medium, such as the storage unit 608.

In some embodiments, part or all of the computer program may be loaded and/or installed into the device 600 via the ROM 502 and/or the communication unit 609. When the computer program is loaded into the RAM 603 and executed by the computing unit 601, one or more steps of the high definition map producing method described above may be performed. Alternatively, in other embodiments, the computing unit 601 may be configured to perform the high definition map producing method by any other suitable means (for example, by means of firmware).

Various implementations of the systems and technologies described herein may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input device, and at least one output device.

Program codes for implementing the method according to the present disclosure may be written in any combination of one or more programming languages. These program codes may be provided to a processor or a controller of a general purpose computer, a special purpose computer, or other programmable data processing devices, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display device (for example, a cathode ray tube (CRT) or liquid crystal display (LCD) monitor) for displaying information to a user: and a keyboard and a pointing device (for example, a mouse or a trackball) by which a user may provide input for the computer. Other kinds of devices may also be used to provide interaction with a user: for example, feedback provided for a user may be any form of sensory feedback (for example, visual feedback, auditory feedback, or tactile feedback): and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server, also called a cloud computing server or a cloud host, and is a host product in a cloud computing service system, so as to overcome the defects of high management difficulty and weak service expansibility in conventional physical host and virtual private server (VPS) service. The server may also be a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A method for generating a high definition map, comprising:
acquiring point cloud data and front-view image data which are collected respectively by a plurality of collecting devices at a plurality of location points, to obtain a sequence of point clouds and a sequence of front-view images;
performing registration of the front-view images and the point clouds on the sequence of point clouds and the sequence of front-view images, wherein adjacent front-view images are registered to obtain a set of registered front-view images, the point clouds of the sequence of point clouds are registered on a reference point cloud, and the registered point clouds are projected onto the obtained set of registered front-view images, so as to obtain coordinate information of pixels in the front-view images;
transforming the sequence of front-view images into a top-view image based on the result of the registration and determining coordinate information of pixels in the top-view image, comprising: transforming respectively the front-view images in the sequence of front-view images into top-view images based on inverse perspective transformation; performing matching on corresponding top-view images according to the coordinate information of pixels in the front-view images, so as to determine the coordinate information of pixels in the top-view images; and splicing the top-view images according to the coordinate information of the pixels in the top-view images, so as to obtain finally the top-view image; and
identifying map elements of the top-view image to obtain the high definition map.

2. The method according to claim 1, wherein performing registration of the front-view images and the point clouds on the sequence of point clouds and the sequence of front-view images comprises:
registering the adjacent images in the sequence of front-view images to obtain sets consisting of corresponding pixels in the adjacent images; and
projecting the registered point cloud data into the sets, so as to obtain coordinate information of pixels in the sets.

3. The method according to claim 2, further comprising: before projecting the point cloud data into the sets,
performing distortion correction on the point cloud data according to a movement amount of 360 degrees of a laser radar device collecting the point cloud data.

4. The method according to claim 2, further comprising: before projecting the point cloud data into the sets,
determining the reference point cloud in the sequence of point clouds; and
registering other point clouds one by one by taking the reference point cloud as a reference.

5. The method according to claim 4, wherein determining the reference point cloud in the sequence of point clouds comprises:
taking a first point cloud in the sequence of point clouds as a reference, and registering other point clouds one by one; and
taking a point cloud in the sequence of point clouds having highest proportion of matching points with a previous point cloud and a next point cloud as the reference point cloud.

6. The method according to claim 4, wherein registering other point clouds one by one comprises:
learning a transformation matrix between the reference point cloud and an adjacent point cloud not registered from points in the two point clouds;
transforming the reference point cloud using the transformation matrix to obtain the adjacent point cloud registered; and
taking the adjacent point cloud as a new reference, and proceeding to perform the step of learning the transformation matrix between the reference point cloud and the adjacent point cloud not registered from points in the two point clouds, until all point cloud data in the sequence of point clouds is registered.

7. The method according to claim 6, wherein the learning the transformation matrix between the reference point cloud and the adjacent point cloud not registered from points in the two point clouds comprises:
learning the transformation matrix between the reference point cloud and the adjacent point cloud from the points in the two point clouds using an ICP algorithm;
wherein the ICP algorithm uses a loss function of: a distance mean or weighted mean between each transformed point obtained by transforming each point in the reference point cloud according to the transformation matrix and each point in the adjacent point cloud closest to the each transformed point.

8. The method according to claim 7, further comprising: before determining the reference point cloud in the sequence of point clouds,
determining a set consisting of corresponding points in the adjacent images; and
when determining the weighted mean, determining a weight for each distance according to whether a point in the reference point cloud belongs to the set consisting of the corresponding points.

9. The method according to claim 2, wherein projecting the point cloud data into the sets, so as to obtain coordinate information of each pixel in the sets comprises:
projecting coordinates of the point cloud data to the sets to obtain the coordinate information of points corresponding to pixels in the front-view images; and
transforming the coordinate information of the points corresponding to the pixels in the front-view images into the coordinate information of the pixels according to a transformation and translation matrix from a laser radar coordinate system to an image-collecting-device coordinate system.

10. The method according to claim 1, wherein identifying the map elements of the top-view image to obtain the high definition map comprises:
identifying road information of the top-view image; and
overlaying the road information identified onto the top-view image for display, to obtain the high definition map.

11. An electronic device, comprising:
at least one processor; and
a memory connected with the at least one processor communicatively;
wherein the memory stores instructions executable by the at least one processor to enable the at least one processor to perform a method for generating a high definition map, which comprises:
acquiring point cloud data and front-view image data which are collected respectively by a plurality of collecting devices at a plurality of location points, to obtain a sequence of point clouds and a sequence of front-view images;

performing registration of the front-view images and the point clouds on the sequence of point clouds and the sequence of front-view images, wherein adjacent front-view images are registered to obtain a set of registered front-view images, the point clouds of the sequence of point clouds are registered on a reference pint cloud, and the registered point clouds are projected onto the obtained set of registered front-view images, so as to obtain coordinate information of pixels in the front-view images;

transforming the sequence of front-view images into a top-view image based on the result of the registration and determining coordinate information of pixels in the top-view image, comprising: transforming respectively the front-view images in the sequence of front-view images into top-view images based on inverse perspective transformation; performing matching on corresponding top-view images according to the coordinate information of pixels in the front-view images, so as to determine the coordinate information of pixels in the top-view images; and splicing the top-view images according to the coordinate information of the pixels in the top-view images, so as to obtain finally the top-view image; and identifying map elements of the top-view image to obtain the high definition map.

12. The electronic device according to claim 11, wherein performing registration of the front-view images and the point clouds on the sequence of point clouds and the sequence of front-view images comprises:

registering the adjacent images in the sequence of front-view images to obtain sets consisting of corresponding pixels in the adjacent images; and projecting the registered point cloud data into the sets, so as to obtain coordinate information of pixels in the sets.

13. The electronic device according to claim 12, wherein the method further comprises: before projecting the point cloud data into the sets, performing distortion correction on the point cloud data according to a movement amount of 360 degrees of a laser radar device collecting the point cloud data.

14. The electronic device according to claim 12, wherein the method further comprises: before projecting the point cloud data into the sets, determining the reference point cloud in the sequence of point clouds; and registering other point clouds one by one by taking the reference point cloud as a reference.

15. The electronic device according to claim 12, wherein projecting the point cloud data into the sets, so as to obtain coordinate information of each pixel in the sets comprises:

projecting coordinates of the point cloud data to the sets to obtain the coordinate information of points corresponding to pixels in the front-view images; and transforming the coordinate information of the points corresponding to the pixels in the front-view images into the coordinate information of the pixels according to a transformation and translation matrix from a laser radar coordinate system to an image-collecting-device coordinate system.

16. A non-transitory computer readable storage medium with computer instructions stored thereon, wherein the computer instructions are used for causing a computer to perform a method for generating a high definition map, which comprises:

acquiring point cloud data and front-view image data which are collected respectively by a plurality of collecting devices at a plurality of location points, to obtain a sequence of point clouds and a sequence of front-view images;

performing registration of the front-view images and the point clouds on the sequence of point clouds and the sequence of front-view images, wherein adjacent front-view images are registered to obtain a set of registered front-view images, the point clouds of the sequence of point clouds are registered on a reference pint cloud, and the registered point clouds are projected onto the obtained set of registered front-view images, so as to obtain coordinate information of pixels in the front-view images;

transforming the sequence of front-view images into a top-view image based on the result of the registration and determining coordinate information of pixels in the top-view image, comprising: transforming respectively the front-view images in the sequence of front-view images into top-view images based on inverse perspective transformation; performing matching on corresponding top-view images according to the coordinate information of pixels in the front-view images, so as to determine the coordinate information of pixels in the top-view images; and splicing the top-view images according to the coordinate information of the pixels in the top-view images, so as to obtain finally the top-view image; and identifying map elements of the top-view image to obtain the high definition map.

17. The non-transitory computer readable storage medium according to claim 16, wherein performing registration of the front-view images and the point clouds on the sequence of point clouds and the sequence of front-view images comprises:

registering the adjacent images in the sequence of front-view images to obtain sets consisting of corresponding pixels in the adjacent images; and projecting the registered point cloud data into the sets, so as to obtain coordinate information of pixels in the sets.

18. The non-transitory computer readable storage medium according to claim 17, wherein the method further comprises: before projecting the point cloud data into the sets, performing distortion correction on the point cloud data according to a movement amount of 360 degrees of a laser radar device collecting the point cloud data.

19. The non-transitory computer readable storage medium according to claim 17, wherein the method further comprises: before projecting the point cloud data into the sets, determining the reference point cloud in the sequence of point clouds; and registering other point clouds one by one by taking the reference point cloud as a reference.

* * * * *

UNITED STATES PATENT AND TRADEMARK OFFICE
CERTIFICATE OF CORRECTION

Page 1 of 1

PATENT NO. : 12,266,074 B2
APPLICATION NO. : 17/758692
DATED : April 1, 2025
INVENTOR(S) : Deguo Xia, Jizhou Huang and Haifeng Wang It is certified that error appears in the above-identified patent and that said Letters Patent is hereby corrected as shown below:

On the Title Page (73), please change the Assignee: "NETCOM SCIENCE TECHNOLOGY CO., LTD., Beijing (CN)" to --BEIJING BAIDU NETCOM SCIENCE TECHNOLOGY CO., LTD., Beijing (CN)--.

Signed and Sealed this
Twenty-ninth Day of April, 2025

Coke Morgan Stewart
*Acting Director of the United States Patent and Trademark Office*